United States Patent
Maddison et al.

(10) Patent No.: US 7,388,599 B2
(45) Date of Patent: Jun. 17, 2008

(54) METHOD AND APPARATUS FOR ACQUIRING DIGITAL MICROSCOPE IMAGES

(75) Inventors: John R Maddison, Tunbridge Wells (GB); Noah F Clinch, Tunbridge Wells (GB)

(73) Assignee: Medical Solutions PLC, Nottingham (GB)

( * ) Notice: Subject to any disclaimer, the term of this patent is extended or adjusted under 35 U.S.C. 154(b) by 724 days.

(21) Appl. No.: 10/322,856

(22) Filed: Dec. 18, 2002

(65) Prior Publication Data

US 2004/0119817 A1    Jun. 24, 2004

(51) Int. Cl.
*H04N 7/18* (2006.01)

(52) U.S. Cl. ............................................ 348/79; 348/61

(58) Field of Classification Search .................... 348/79, 348/61, 383; 382/128, 255, 294; 359/369; 250/201.3

See application file for complete search history.

(56) References Cited

U.S. PATENT DOCUMENTS

| | | | | |
|---|---|---|---|---|
| 4,700,298 A | * | 10/1987 | Palcic et al. | 382/128 |
| 4,911,543 A | * | 3/1990 | Hodgson | 359/369 |
| 5,771,072 A | * | 6/1998 | Tokoro et al. | 348/383 |
| 6,078,701 A | * | 6/2000 | Hsu et al. | 382/294 |
| 6,219,437 B1 | | 4/2001 | Baldur | |
| 6,313,452 B1 | * | 11/2001 | Paragano et al. | 250/201.3 |
| 6,483,948 B1 | * | 11/2002 | Spink et al. | 382/255 |

FOREIGN PATENT DOCUMENTS

| EP | 0 557 558 A1 | * | 9/1993 |
|---|---|---|---|
| GB | 1 404 628 A | | 9/1975 |
| WO | WO 97/04347 A1 | | 2/1887 |
| WO | WO 01/84209 A2 | | 11/2001 |
| WO | WO 02/056084 A1 | | 7/2002 |

* cited by examiner

*Primary Examiner*—Allen Wong
(74) *Attorney, Agent, or Firm*—Vierra Magen Marcus & DeNiro LLP

(57) ABSTRACT

A method and apparatus for acquiring digital microscope images is disclosed, in which a plurality of magnified images of a specimen are captured for tiling together to provide an overall composite image of the specimen. In accordance with the described method, the specimen is moved relative to an imaging system comprising a microscope and camera in a predetermined path whilst the plurality of magnified images are captured. In a preferred embodiment, the specimen, contained on a slide, is mounted on a movable microscope stage, and is moved beneath the microscope in the predetermined path. The velocity of the movement of the stage and the shutter speed of the camera is computer controlled to capture overlapping, clear images.

42 Claims, 4 Drawing Sheets

A simple cross correlation algorithm is used to calculate the best alignment of the images. Only a portion of the image is need to create the optimum positioning.

METHOD AND APPARATUS FOR ACQUIRING DIGITAL MICROSCOPE IMAGES

PRIORITY CLAIM

The present application claims priority to UK Patent Application No. 01 302 06.6, entitled "Method And Apparatus For Acquiring Digital Microscope Images", which application was filed on Dec. 18, 2001.

BACKGROUND OF THE INVENTION

1. Field of the Invention

The present invention relates to a method and apparatus for acquiring digital microscope images, and more particularly to a method and apparatus for acquiring a digital image of a specimen, or part thereof, on a microscope slide, which is larger than the field of view of the microscope.

2. Description of the Related Art

The use of digital images of microscope specimens, which are typically displayed on a display screen, is becoming increasingly important in the field of diagnostic pathology. For example, digital images of a microscope specimen may be captured using a microscopy imaging system and the acquired digital image data may be assembled together to form a composite image of the specimen, and transmitted to local or remote locations for diagnosis by a pathologist. Thus, the acquisition of digital images of pathology specimens advantageously enables specimens to be viewed by consultant pathologists at remote locations.

Conventional methods for acquiring a digital image of a microscope specimen which is larger than a single field of view image involves acquiring separate, adjacent field of view digital images or image "tiles" and subsequently mosaicing (also known as montaging or tiling) the adjacent images to obtain an overall composite image of the specimen or part thereof.

For example, WO-A-98/39728 discloses a method and apparatus for acquiring and reconstructing contiguous specimen image tiles. The adjacent image tiles are obtained by computer-controlled positioning of the microscope stage, on which the microscope slide is placed, beneath the imaging system comprising microscope and digital camera. The stage is driven by stepper motors, under control of a computer, in steps to precisely position the stage for acquiring each image tile, contiguous with the preceding image tile. Since the image tiles are contiguous, the image tiles can be readily seamlessly matched or abutted together to form a composite image.

Similarly, in EP-A-0 994 433, in the name of the present applicant, a method of acquiring digital microscope images is disclosed in which adjacent image tiles similarly are obtained by stepwise imaging of the specimen.

Whilst such conventional methods of acquiring digital microscope images result in a high quality composite image of the specimen, the imaging process is time consuming, particularly if imaging of a complete specimen is performed using a medium or high power objective lens in the microscope. This is because the time taken to image the complete specimen is proportional to the number of image tiles in the complete specimen. The higher the magnifying power of the objective lens, the smaller the area of the specimen contained in the field of view, and the greater the number of image tiles.

Moreover, the time taken to acquire an individual image tile is subject to physical constraints. In particular, for each image tile it is necessary to perform the sequential steps of: i) moving the microscope stage to the correct position; ii) pausing to allow the microscope stage to come to rest; iii) if necessary, focusing the microscope, and iv) operating the camera to acquire the image. To prevent excessive vibration or jitter of the stage during the stepwise movement, which would lead to poor quality images, the velocity of movement in step i) and the duration of the pause in step ii) are constrained by the physical limitations of the stage so that the time taken cannot be reduced below a certain amount.

In view of these limitations, imaging of a complete specimen of say 20 mm by 20 mm at 40× magnification may take over an hour and could take five to six hours. This time delay in the image of the specimen becoming available for diagnosis by a pathologist is problematic. In addition, the use of the valuable resource of the imaging system for such a lengthy period of time for only a single specimen may be difficult to justify.

One way of addressing this problem is to limit the area of the specimen to be imaged at high magnification to only selected portions. By restricting the area to be imaged at high magnification, it is possible to reduce the amount of time needed to acquire the specimen images. However, the selection of appropriate areas must be done by a skilled pathologist. In particular, it is necessary for an expert to identify the most significant regions of the specimen, to be viewed at high magnification, in order to make an accurate diagnosis.

If the pathologist is local to the imaging system, then the pathologist can select the relevant areas for scanning. However, this process represents a poor use of the pathologist's time. In addition, if a remote pathologist is then consulted for a second opinion, the remote pathologist will not be able to view, at high magnification, areas of the specimen other than those selected by the local pathologist. This compromises the ability of the remote pathologist to make an accurate diagnosis, since he or she is reliant on the local pathologist having selected all the important areas of the specimen. Many consultant pathologists will be reluctant to give a diagnostic opinion based on the limited images selected by another pathologist, particularly if that pathologist is not know to him or her.

One way of avoiding this problem, suggested in WO-A-98/44446, is to allow the remote pathologist to select the areas of the specimen for scanning at high magnification. However, this solution has the disadvantage that there will be a further delay between the time the remote pathologist makes the selection and the time when high magnification images become available due to the time taken for the specimen area to be imaged.

The method disclosed in EP-A-0 994 433 involves scanning the complete specimen only at high magnification. This overcomes the problem of only selected areas of the specimen being available for viewing by a pathologist at high magnification. However, as explained above, the process of acquiring adjacent high magnification images by stepwise movement of the stage is time consuming.

It would therefore be desirable to provide a method and apparatus for acquiring digital images of a microscope specimen at high magnification more quickly than conventional methods.

SUMMARY OF THE INVENTION

In accordance with a first aspect, the present invention provides a method for acquiring image data representing a digital image of at least part of microscope specimen using an imaging system, the method comprising moving the specimen relative to the imaging system in a predetermined path, whilst capturing a plurality of magnified images of the specimen.

By acquiring field of view images whilst the microscope stage (and thus the specimen) is moving relative to the imaging system, in accordance with the present invention, it is possible to significantly reduce the imaging time for a complete specimen. The imaging system resource can therefore be used to image a greater number of specimens per day than would be imaged using conventional imaging techniques.

The predetermined path may comprise a series of sub-paths or portions along which imaging takes place, interconnected by a series of sub-paths or portions along which imaging does not take place. For example, in a preferred embodiment, the imaging portions of the determined path comprise a series of parallel rows, each portion beginning at a first end of the row, so that each row is interconnected by a non-imaging portion of the path that extends diagonally back along the row.

Preferably, the plurality of images are captured at periodic intervals. In a preferred embodiment, the time interval between capturing an image, and the velocity of movement of the specimen within the imaging system are chosen such that overlapping images are acquired.

In a preferred embodiment, the microscopy imaging system comprises a microscope, particularly an optical microscope, and associated image capturing device, particularly a digital camera. A motorised microscope stage, holding the microscope slide containing the specimen, is driven beneath the stationary microscope.

The speed and direction of movement of the microscope stage is computer-controlled and the time interval between taking images using the digital camera is synchronised with the movement so that images with a desired amount of overlap are acquired.

Preferably, the method further comprises processing the image data for the acquired plurality of digital images to obtain data representing a composite image of the specimen. In particular the overlapping images can be assembled together, and the duplicated data at the area of overlap removed, to form a composite image by digital image processing techniques during and/or after the imaging of the complete specimen has finished.

Preferably the image processing is performed by cross-correlation of two adjacent images, and the amount of overlap of the images is sufficient to enable the accurate cross-correlation. Typically the overlap of adjacent images is between 10% and 15%, preferably about 10% of the image or up to 100 pixels of the camera.

In a preferred embodiment, the cross correlation is performed in an area of image overlap determined according to the velocity of the stage at the time the images were acquired. By restricting the area of overlap considered during cross-correlation, the image alignment processing time can be kept to a minimum.

In accordance with a second aspect, the present invention provides a computer readable medium having a computer program for controlling a microscopy imaging system to carry out a method in accordance with the first aspect of the present invention.

In accordance with a third aspect, the present invention provides a microscopy imaging system configured to carry out a method in accordance with the first aspect of the present invention.

Other preferred features and advantages of the present invention will be apparent from the following description and accompanying claims.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

Figure 1:
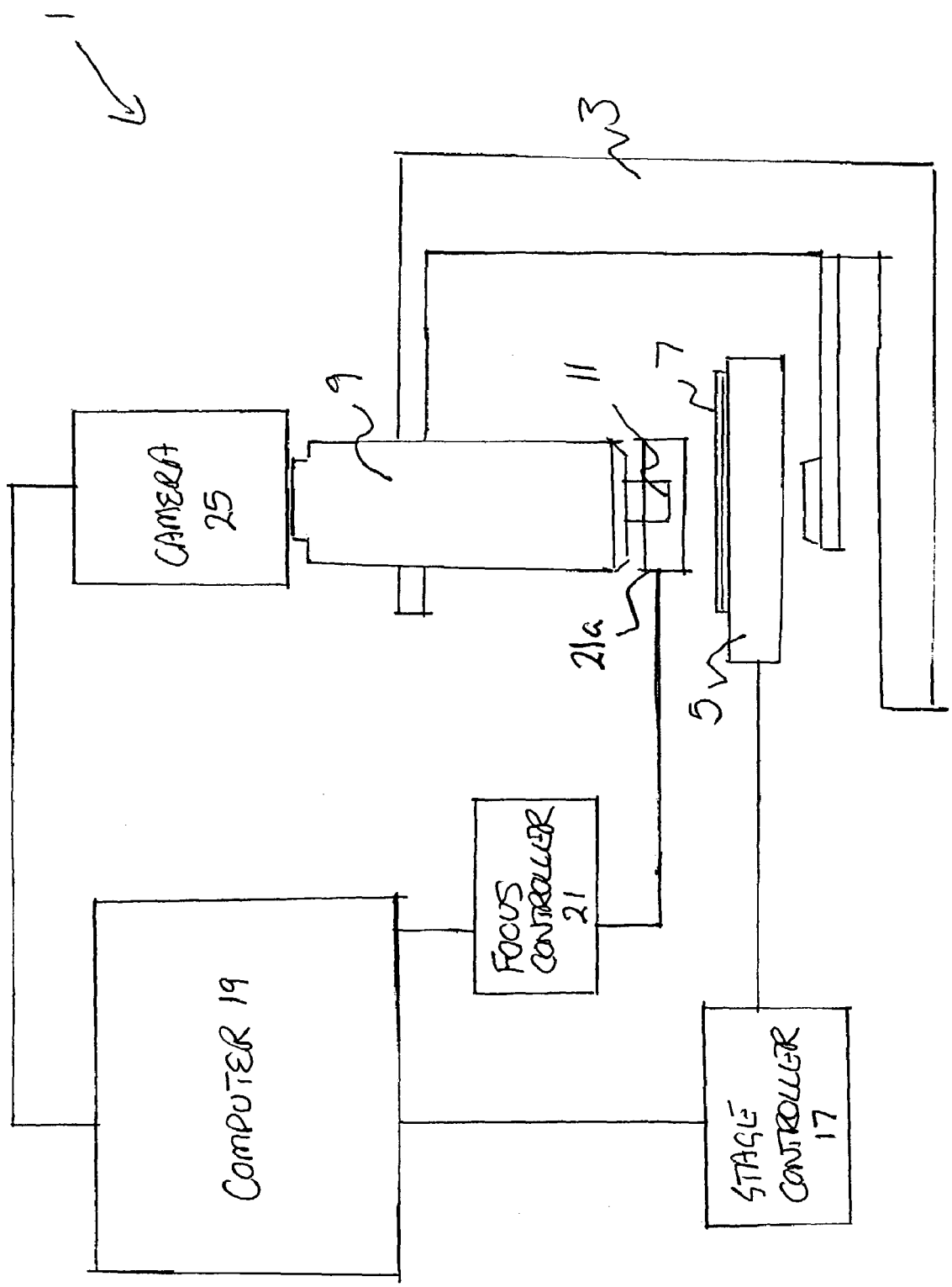
FIG. 1 is a perspective view of a microscopy imaging system in accordance with an embodiment the present invention.

FIG. 1 illustrates the digital imaging apparatus suitable for use in accordance with a preferred embodiment of the present invention. The imaging apparatus 1 comprises a microscope 3 having a motorised microscope stage 5 for holding a microscope slide 7, and an optical subsystem 9 including an objective lens 11 and eyepiece 15. An example of a suitable microscope is the Axioplan 2 imaging microscope available from Carl Zeiss of Germany, using an Apochromat objective lens. The stage may be any suitable motorised stage having the necessary positioning accuracy, for example the Proscan stage available from Prior Scientific Instruments Limited of Cambridge, UK.

The motorised stage 5 is driven under the control of a stage controller 17, which controls the stage in response to instructions from computer 19. The motorised stage 5 is typically driven only in the x- and y- directions. In addition, focusing of the microscope is controlled by a piezo-electric controller 21 which controls a focussing device 21a which moves the objective lens 11 towards and away from the slide 7, along the axis of the optical system 9, to focus the microscope 3, under control of computer 19. A suitable piezo-electric focusing controller 21 is available from Physik Instrumente of Germany.

The imaging apparatus 1 additionally includes a digital camera 25, preferably a high resolution CCD camera. In the preferred embodiment, camera 25 includes a square array of CCD sensors, for example about 1024×1024 pixels and of 24-bit colour. The individual pixels of the camera are preferably square. Examples of suitable digital cameras are the X003P Firewire camera available from Sony Corporation and the Hamamatsu Orca C4742SC camera. The skilled person will appreciate that in other embodiments a single line camera comprising a single line of CCD sensors or a TDI (Time Delay Integration) camera comprising about ten lines of CCD sensors can be employed.

The camera 25 is arranged to acquire images from the microscope 3 under control of computer 19 and to provide the acquired images to computer 19 for processing, as described below.

As the skilled person will appreciate, prior to acquiring the images of the specimen, in accordance with the method of the present invention described below, the imaging system is calibrated using conventional techniques. The calibration information is input to computer 19 and used to determine the distance between and number of overlapping images to be acquired for a given specimen area, and thus the optimum parameters used for driving the stage 5 and controlling the camera 25.

Figure 2:
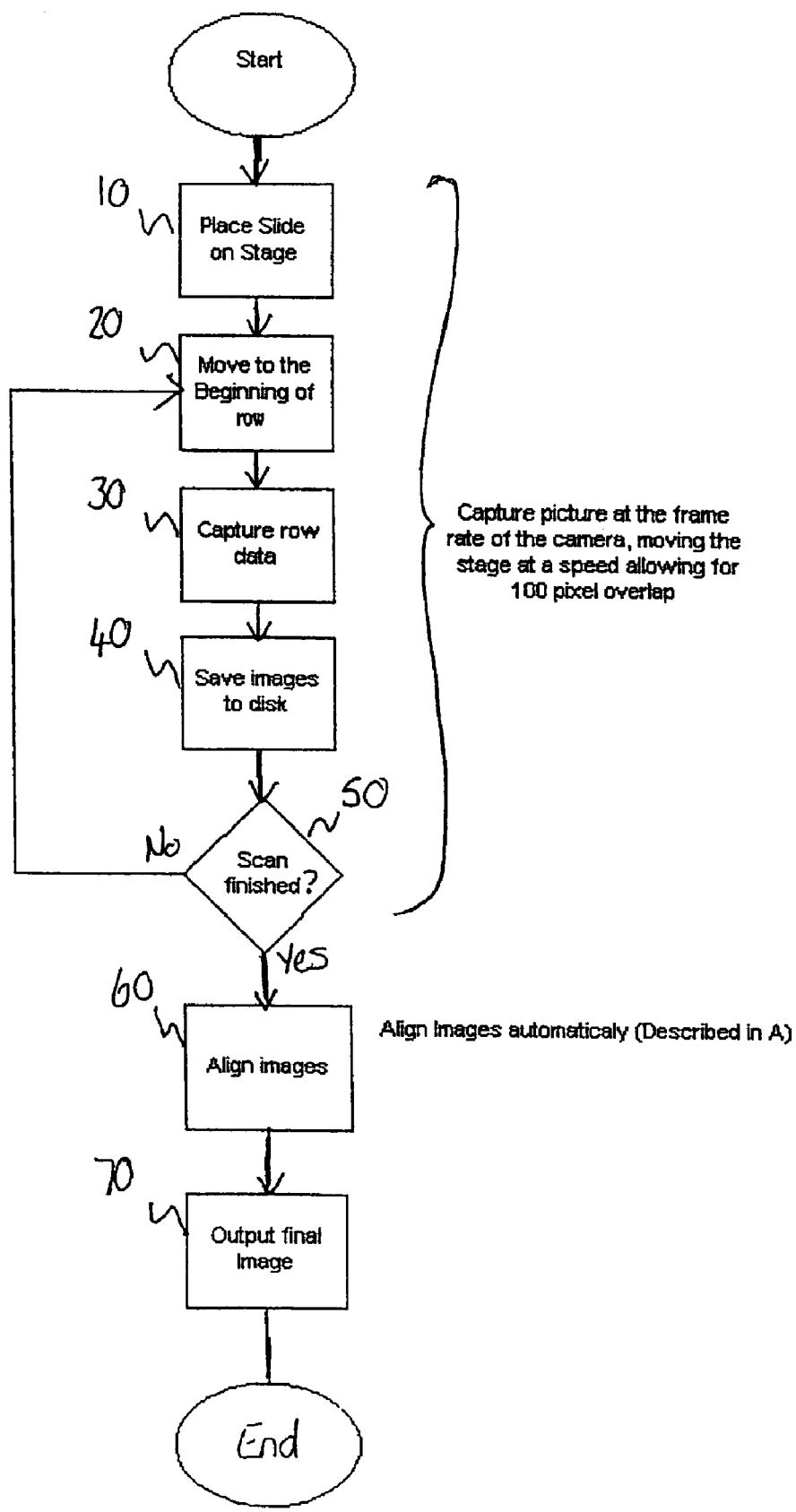
FIG. 2 is a flow diagram illustrating the method of image acquisitioning in accordance with a preferred embodiment the present invention.

The method of acquiring a digital image of a microscope specimen, or more particularly, data representing a digital image of a significant part of a specimen on a microscope slide, using the apparatus of FIG. 1 is illustrated generally in FIG. 2.

At step 10, the microscope slide 7 containing the specimen in a specimen area 8 thereof is placed on the microscope stage 5. The stage 5, with the slide 7 thereon, is then moved, typically under manual control, so that the starting position of the specimen area 8 to be imaged is in the field of view of the microscope, and the stage coordinates of the starting position are input to the computer. Similarly, the stage is then positioned so that the finishing position of the specimen area 8 to be imaged is in the field of view and the coordinates of the finishing position input to the computer. Computer 19 is then able to determine the path along which the stage 5 will be driven, between the starting position and the finishing position, during imaging of the complete specimen area 8, as well as the optimum control parameters for moving the stage and for controlling the camera.

It should be noted that although the path along which the stage will be driven is typically a continuous path, imaging may only take place along certain sub-paths or portions (referred to herein as "imaging portions" of the determined path). These imaging portions of the path are interlinked by portions of the path along which no images are captured. The camera 25 is controlled, by computer 19, to capture images whilst the stage is moving along the imaging portions of the determined path so that the images are obtained in a sequence that can be most readily processed and stored for providing a composite image of the complete specimen, as described below.

At step 20, under control of the computer 19, the stage 5 is then automatically positioned to the starting position, for example corresponding to one of the corners of the specimen area of the slide 7, so that the first image is in the field of view of the microscope 3. Typically this is the top left hand corner of the specimen area 8 as shown labelled IA in FIG. 3B. In other embodiments, the starting position may be elsewhere e.g. on the left hand side in the centre of the specimen area.

Figure 3A:
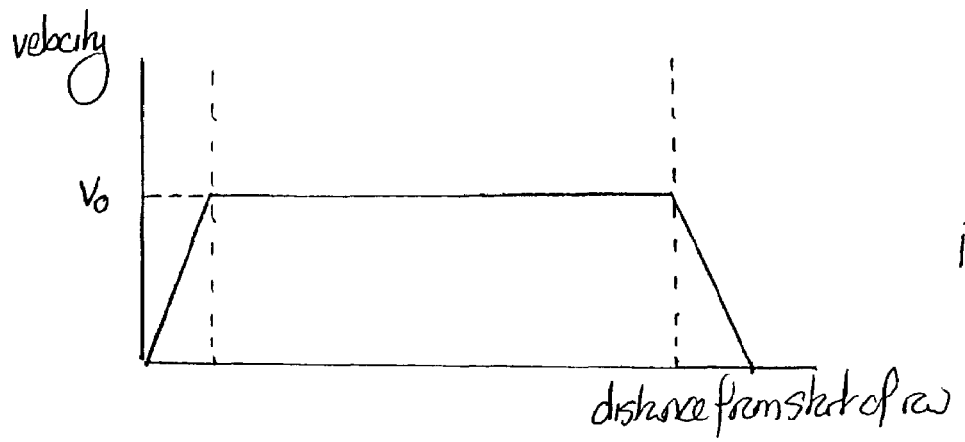
FIG. 3A is a graph illustrating the velocity of the microscope stage during the acquisition of a row of overlapping images.

At step 30, under control of computer 19 and stage controller 17, the microscope stage 5 is driven along a first portion of the determined path, which, in this example, is a straight line, preferably along the x-direction and parallel to the top edge of the slide (it is assumed that the slide is aligned carefully on the microscope stage), so that the stage travels a distance corresponding to the complete width of the specimen area 8. The velocity of movement of the stage 5 along the first, and each subsequent, imaging portion (row) of the determined path is illustrated in FIG. 3A, and is described in more detail below. At the same time, the shutter of the camera 25 is operated at a fast shutter speed at periodic intervals to acquire digital images, each image corresponding to the field of view of the microscope. Movement of the stage 5 and operation of the camera 25 continues until the stage comes to rest at the opposite end of the specimen area 8, from the starting position, typically the top right hand corner of the specimen area labelled IN in FIG. 3B.

The camera 25 thus captures a row of images (e.g. row I in FIG. 3B) of the specimen area 8 of the slide 7, the row of images underlying the microscope during the movement of the stage 5 along the first portion of the determined path.

At step 40, the camera 25 passes the acquired data for the row of captured images to the computer 19 for further processing as described below.

At step 50, the computer 19 considers whether the imaging process is complete, that is, whether the coordinates of the stage are at the finishing position, and thus the complete specimen area 8 has been imaged. If the scan is not complete, the method returns to step 20 by moving the stage 5, without performing imaging, to the starting position of the next imaging portion of the determined path, which in a preferred embodiment is the beginning of the next row of images (e.g. row II, starting at position IIA of FIG. 3B). Thus the microscope stage 5 is positioned so that the field of view contains an image that is adjacent to, and contiguous with or slightly overlapping, the image acquired at the first position (IA) of the previous row of images. The method then continues by capturing the next row of images.

Once the computer 19 determines that the scan is complete, that is, the stage has reached the finishing position, and image data has been acquired for the complete specimen area, the method continues with step 60.

At step 60, the computer 19 processes the data for the acquired overlapping digital images to obtain processed data representing a single composite image of the complete specimen or part thereof. This is achieved conventionally by mosaicing techniques, well known in the art. Since, in the present invention, the individual images are overlapping, a cross-correlation algorithm is used to calculate the best alignment of the images with respect to each other. Further details of the preferred method of alignment of the images are set out below.

Once the images have been aligned for the complete specimen, data representing the final composite image is output at step 70 for storage in memory, preferably as a single image file.

It will be appreciated that steps 20 to 70 of the above-described method are preferably implemented in the form of one or more computer programs running on computer 19. The computer program(s) may be provided on a computer readable medium such as an optical or magnetic disk which can be loaded in a disk drive of computer 19. Alternatively, the computer readable medium may be a computer system carrying the website or other form of file server from which the computer program(s) may be downloaded to computer 19 over the Internet or other network.

FIG. 3A is a graph representing the velocity of the stage during the acquisition of images of the specimen on the microscope slide 7. Ideally, the velocity of the stage should be at a constant optimum velocity $V_o$ throughout the acquisition of a row of images, so that the amount of overlap of adjacent images is substantially constant. As the skilled person will appreciate, the optimum velocity is dependent upon the operating characteristics of the camera. However, in the preferred embodiment, it is necessary to accelerate the stage from stationary to the optimum velocity $V_o$ at the start of a row and decelerate the stage from the optimum velocity $V_o$ to stationary at the end of the row. It is important that the acceleration/deceleration of the stage at the beginning and end of a row should be such that the movement of the stage is smooth throughout image acquisition to achieve consistently clear images.

Accordingly, in the preferred embodiment as illustrated in FIG. 3A, the stage is moved under control of computer 19 to steadily increase the velocity of the stage up to the optimum velocity $V_o$ in the minimum time. The acceleration applied to the stage is determined and controlled by computer 19 and is dependent upon properties of the motorised stage 5, and the determined optimum velocity $V_o$. Typically, the time taken to ramp up to the optimum velocity represents only about 5% of the time for the imaging of the row, and similarly the time taken to ramp down from the optimum velocity represents only about 5% of the time for the imaging of the row.

Whilst in the preferred embodiment, images are acquired during the acceleration and deceleration stages respectively at the beginning and end of a row, in an alternative implementation, it would be possible to accelerate the stage to the optimum velocity before reaching the starting position and similarly decelerate the stage after the end of a row. This would require careful synchronisation of camera and stage to ensure that the operation of the camera is synchronised with the beginning and end of a row. In addition, the imaging time would be increased due to the extra distance travelled beyond the specimen area during the acceleration and deceleration of the stage for each row.

In the preferred embodiment it is desirable to monitor and control the velocity of the microscope stage in conjunction with the shutter speed of the camera 25 in order to assist in the subsequent image processing.

Furthermore, in order to reduce the imaging time to a minimum, it is desirable to acquire images with a minimum overlap (so that fewer images are acquired for each row) but having sufficient duplication in data to enable accurate cross-correlation to be performed. This is achieved by using the shortest possible exposure time (i.e. fastest possible shutter speed) for the camera 25 (typically the exposure time is of the order of µs), to avoid motion blurring (a well known phenomenon associated with photographing a moving object), and the fastest possible frame rate (number of frames per second) for the camera 25 (typically 9 to 15 frames per second), whilst moving the microscope stage at an optimum speed of to achieve a desired overlap, typically about 10% using current cross-correlation techniques.

Thus, the optimum velocity $V_o$ for the stage 5 is calculated such that i) the distance travelled by the stage in the time period that the shutter is open (shutter speed) is sufficiently small to avoid blurring of the image due to motion blur, whilst at the same time ii) the distance travelled by the stage in the time interval between the operation of the shutter (time interval=1/frame rate) must be sufficiently large that the next image includes a maximum amount of new image data (i.e. a minimum overlap or duplication of image data that is sufficient for accurate cross-correlation).

Figure 3B:
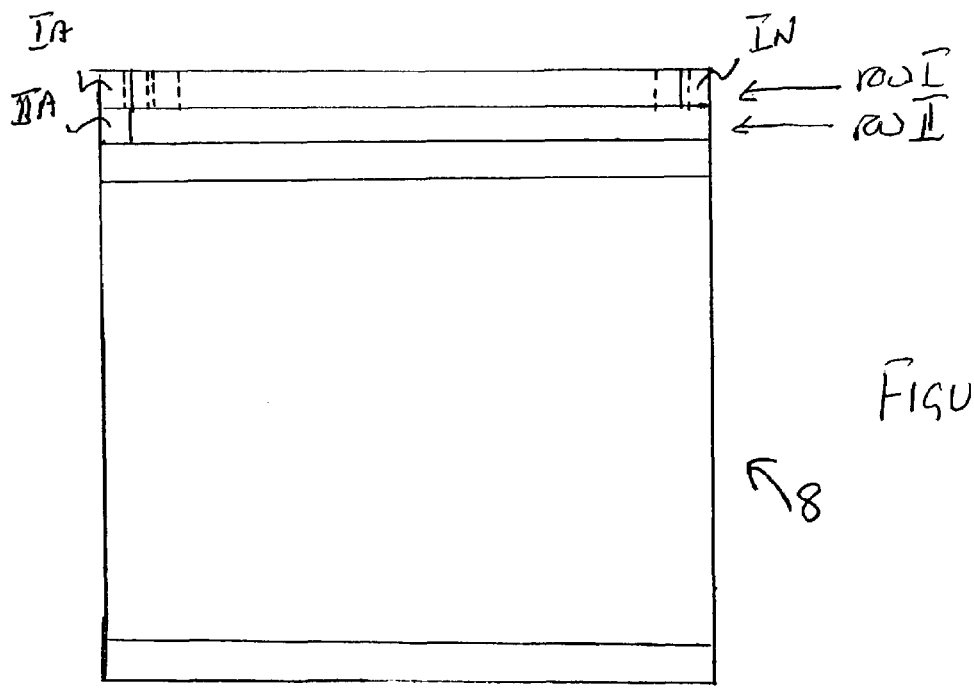
FIG. 3B illustrates a specimen area of a microscope slide and the rows of acquired images, in accordance with a preferred embodiment of the present invention.

FIG. 3B illustrates the specimen area 8 of the microscope slide 7 from which the images are acquired. The starting and finishing positions at the beginning and end of a row are illustrated by a solid line, and the boundaries of the images acquired are illustrated by a dashed line.

Although not essential to the invention, in the preferred embodiment, the time interval between operation of the camera shutter is substantially constant. Thus, the images at the beginning and end of a row may overlap by a greater distance than the images in the middle of the scan. For the various positions in the row, the amount of overlap of the acquired images can be determined using the velocity information and the shutter interval, which can then be used during the reconstruction or mosaicing of the images to form the composite image of the entire specimen as described below.

Figure 4:
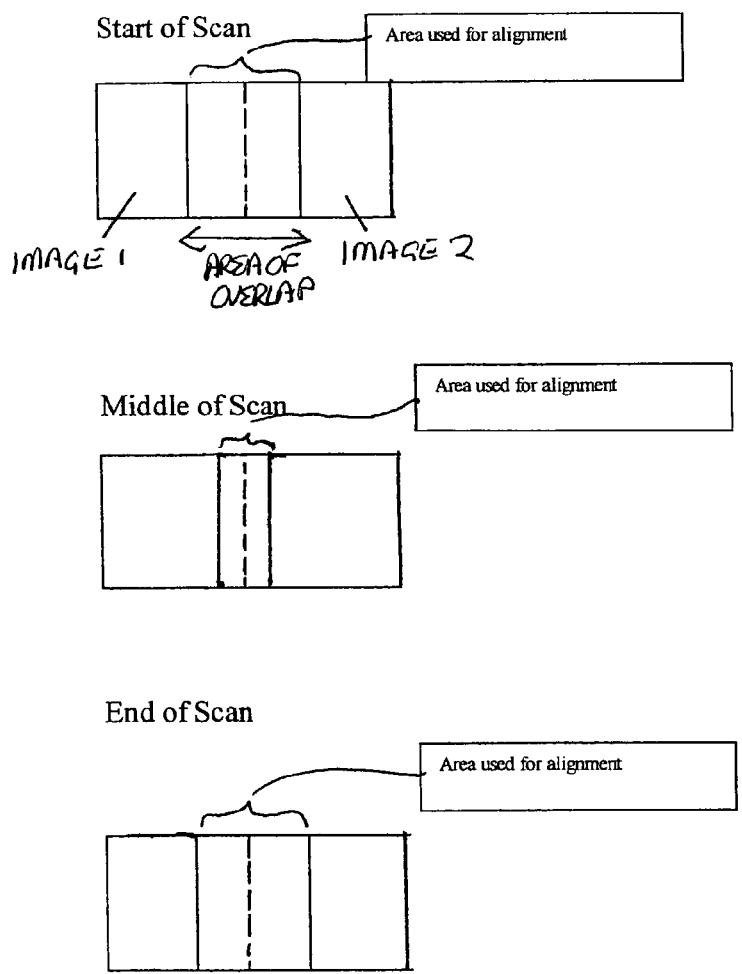
FIG. 4 illustrates the margin of overlap of images used to assist in constructing a composite image of the specimen from the separate acquired images in accordance with the preferred embodiment of the present invention.

FIG. 4 illustrates the areas of the acquired images, at the beginning, middle and end of a row, which are used during the cross-correlation processing to properly align the separate acquired images to form the composite image. As shown in FIG. 4, since the approximate amount of overlap at these positions can be predicted based on the velocity of the stage, only a portion of each image, centred around the expected position of overlap, needs to be used in the cross correlation processing to create the optimum alignment of the images with each other. Thus, the cross-correlation technique compares the pixels of a vertical line in the area used for alignment of one image with the pixels of vertical lines in the region of overlap in the adjacent image. When a match or substantial match is achieved with respect to one or several adjacent lines of pixels, alignment is considered to be achieved.

As will be appreciated from the above description, the processing of the image data to align the acquired images can be performed simultaneously with or subsequent to the acquisition of the image data.

In an example, the inventors performed imaging of a specimen area of about 20 mm×20 mm using a 20× Apochromat objective lens in a Zeiss Axioplan 2 Imaging microscope having a Prior Scientific proscan motorised stage. A Hamamatsu Orca C4742SC camera was used to capture images with the exposure time set to "2" (believed to be 2 ms) and the frame rate was 9 frames $s^{-1}$.

The imaging process produced 4225 (65×65) individual images and was completed in a time of about 15 minutes. The overlap between adjacent images in a row was found to be in the region of 10% of the image area or about 100 pixels and between adjacent rows of less than 0.05% or about 5 pixels. The image data processing time for the complete specimen area was about 10 minutes. Good image alignment was achieved using currently available cross-correlation techniques and the composite overall image of 65000 by 65000 pixels representing the 20 mm by 20 mm specimen area provided good image resolution when reproduced on screen.

Thus, by continuous movement of the stage during the image acquisition process, it is possible to reduce the scanning time for a complete specimen at medium (e.g. 20×) and high (e.g. 40×) magnifications, to less than an hour for a standard specimen area of 20 mm×20 mm. Thus, the images are available more quickly for diagnosis by a pathologist.

Moreover, although the image processing time is increased in comparison to prior art techniques in which contiguous images are acquired, since the processing can be performed remote from the imaging system, the imaging system itself is made available more quickly for imaging further specimens. Moreover, through the use of multi-threading techniques and more powerful processors, theoretically, the processing time could be reduced below 10 minutes.

Various modifications and changes can be made to the described embodiments.

For example, it would be possible to acquire the images using a strobe light to periodically illuminate the specimen. By synchronising the illumination by the strobe with the shutter of the camera a slower shutter speed can be used.

Moreover, although in the described embodiment a constant frame rate (shutter interval) is used, the frame rate may be adjusted with changes in velocity of the stage to optimise the imaging process.

If the preferred embodiment, each row of images is captured starting at a first end of the specimen area, whereby the stage is driven in a zig-zag path so that the images are output in raster-scan order. It will be appreciated that in other embodiments, alternate rows of images may be captured starting at the second end of the specimen area, so that the imaging portions of the path are not interlinked by long-diagonal non-imaging return paths. In this case, the images would not be output in raster-scan order and the image data would therefore be processed differently.

Whilst the preferred embodiment uses a digital CCD camera, in an alternative embodiment an analog video camera may be used to capture the images.

It is intended to include all such variations, modifications and equivalents which fall within the spirit and scope of the present invention as defined in the accompanying claims.

The invention claimed is:

1. A method for acquiring image data representing an image of at least part of a microscope specimen using an imaging system having a two dimensional array of pixels to capture corresponding two dimensional images, the method comprising:
    moving the specimen relative to the imaging system in a predetermined path;
    capturing a plurality of adjacent overlapping two dimensional images of the specimen while moving the specimen; and
    assembling a composite image from the plurality of captured adjacent overlapping two dimensional images by removing duplicated overlapping regions from the captured adjacent overlapping two dimensional images, wherein the overlap of adjacent images is between 10% and 15%;
    wherein a time interval between capturing each image, and the velocity of movement of the specimen relative to the imaging system, are chosen such that each image is substantially free of motion blur.

2. A method as claimed in claim 1, in which each of the plurality of images comprises an image of the field of view of the imaging system.

3. A method as claimed in claim 1, in which the step of capturing a plurality of images comprises capturing each image after a periodic time interval.

4. A method as claimed in claim 1, in which the predetermined path comprises a series of parallel rows, each adjacent row separated by a distance such that contiguous or slightly overlapping images are acquired.

5. A method as claimed in claim 1, in which the imaging system comprises a magnifying subsystem and an associated image capturing device.

6. A method as claimed in claim 1, wherein the imaging system comprises a magnifying subsystem and an associated image capturing device, and wherein the magnifying subsystem comprises an optical microscope and the image capturing device comprises a digital camera.

7. A method as claimed in claim 1, wherein the imaging system comprises a digital camera which is a TDI camera.

8. A method as claimed in claim 1, in which the specimen is moved in the predetermined path within the imaging system.

9. A method as claimed in claim 1, in which a stage, holding a slide containing the microscope specimen, is driven beneath the imaging system in the predetermined path.

10. A method as claimed in claim 1, in which digital image processing techniques are performed during and/or after the imaging of the complete specimen has finished.

11. A method as claimed in claim 1, in which cross-correlation of two adjacent images is performed, and an amount of overlap of the images is sufficient to enable accurate cross-correlation.

12. A method as claimed in claim 1, in which, cross-correlation of two adjacent images is performed, and an amount of overlap of the images is sufficient to enable accurate cross-correlation, wherein the cross correlation is performed in an area of image overlap determined according to the velocity of the specimen at the time the images were acquired.

13. A method as in claim 1, wherein the overlap of adjacent images is preferably about 10%.

14. A method as in claim 1, wherein the overlap of adjacent images is preferably up to 100 pixels of the imaging system.

15. A method for acquiring image data representing an image of at least part of a microscope specimen using an imaging system comprising a two dimensional array of pixels to capture corresponding two dimensional images, the method comprising:
    moving the specimen relative to the imaging system in a movement direction along a predetermined path; and
    during said step of moving the specimen relative to the imaging system, capturing a plurality of adjacent overlapping two dimensional images of the specimen, the overlap being in the movement direction;
    wherein the method comprises assembling a composite image from the plurality of overlapping adjacent two dimensional images by removing duplicate overlapping regions from the captured adjacent overlapping two dimensional images, characterised in that the method comprises moving the specimen relative to the imaging system from a start imaging position to an end imaging position on the path by steadily increasing the velocity of relative movement proximal to the start imaging position to a constant velocity and then steadily decreasing the velocity proximal to the end imaging position.

16. A method as in claim 15, wherein the method comprises moving the specimen relative to the imaging system from a start imaging position to an end imaging position on the path by steadily increasing the velocity of relative movement from the start imaging position to a constant velocity and then steadily decreasing the velocity to the end imaging position.

17. A method as in claim 15, wherein each of the plurality of images comprises an image of the field of view of the imaging system.

18. A method as in claim 15, wherein the step of capturing a plurality of images comprises capturing each image after a periodic time interval.

19. A method as in claim 15, wherein a time interval between capturing each image, and the velocity of movement of the specimen relative to the imaging system, are chosen such that each image is substantially free of motion blur.

20. A method as in claim 15, wherein the predetermined path comprises a series of parallel rows, each adjacent row separated by a distance such that contiguous or slightly overlapping images are acquired.

21. A method as in claim 15, wherein the imaging system comprises a magnifying subsystem and an associated image capturing device.

22. A method as in claim 15, wherein the imaging system comprises a magnifying subsystem and an associated image capturing device, and wherein the magnifying subsystem comprises an optical microscope and the image capturing device comprises a digital camera.

23. A method as in claim 15, wherein the imaging system comprises a digital camera which is a TDI camera.

24. A method as in claim 15, wherein the specimen is moved in the predetermined path within the imaging system.

25. A method as in claim 15, wherein a stage that holds a slide containing the microscope specimen is driven beneath the imaging system in the predetermined path.

26. A method as in claim 15, wherein digital image processing techniques are performed during and/or after the imaging of the complete specimen has finished.

27. A method as in claim 15, wherein cross-correlation of two adjacent images is performed, and an amount of overlap of the images is sufficient to enable accurate cross-correlation.

28. A method as in claim 15, wherein cross-correlation of two adjacent images is performed, and an amount of overlap of the images is sufficient to enable accurate cross-correlation, wherein the cross correlation is performed in an area of image overlap determined according to the velocity of the specimen at the time the images were acquired.

29. A method as in claim 15, wherein the overlap of adjacent images is preferably about 10%.

30. A method as in claim 15, wherein the overlap of adjacent images is preferably up to 100 pixels of the imaging system.

31. A computer readable medium encoded with a computer program having executable instructions for controlling an imaging system to carry out a method for acquiring image data representing an image of at least part of a microscope specimen using the imaging system, the method comprising moving the specimen relative to the imaging system in a movement direction along a predetermined path whilst capturing a plurality of adjacent overlapping images of the specimen using a two dimensional array of pixels, the overlapping being in the movement direction, the method comprising assembling a composite image from the plurality of adjacent overlapping two dimensional images captured by removing duplicate overlapping regions from the captured adjacent overlapping two dimensional images, wherein the method comprises moving the specimen relative to the imaging system from a start imaging position to an end position on the path by steadily increasing the velocity of relative movement proximal the start imaging position to a constant velocity and then steadily decreasing the velocity proximal to the end imaging position.

32. A method as in claim 31, wherein the method comprises moving the specimen relative to the imaging system from a start imaging position to an end imaging position on the path by steadily increasing the velocity of relative movement from the start imaging position to a constant velocity and then steadily decreasing the velocity to the end imaging position.

33. An imaging system for acquiring image data representing a digital image of at least part of a microscope specimen, the imaging system comprising a two dimensional array of pixels to capture corresponding two dimensional images, the imaging system configured to capture a plurality of adjacent two dimensional images of a specimen while the specimen is moved relative to the imaging system in a movement direction along a predetermined path, and wherein the imaging system is arranged to capture a plurality of adjacent overlapping two dimensional images, the overlap being in the movement direction, and to form a composite image by removing duplicate overlapping regions of captured adjacent two dimensional images, and wherein the system is arranged to move the specimen relative to the imaging system from a start imaging position to an end imaging position on the path by steadily increasing the velocity of relative movement proximal the start imaging position to a constant velocity and then steadily decreasing the velocity proximal to the end imaging position.

34. An imaging system as in claim 33, wherein the system is arranged to move the specimen relative to the imaging system from a start imaging position to an end imaging position on the path by steadily increasing the velocity of relative movement from the start imaging position to a constant velocity and then steadily decreasing the velocity to the end imaging position.

35. An imaging system for acquiring image data representing a digital image of at least part of a microscope specimen, the imaging system comprising a two dimensional array of pixels to capture corresponding two dimensional images, the imaging system configured to capture a plurality of adjacent two dimensional images of a specimen whilst the specimen is moved relative to the imaging system in a predetermined path and the system is arranged to capture a plurality of adjacent overlapping two dimensional images, the overlap being in the movement direction, and to form a composite image by removing duplicated overlapping regions of captured adjacent two dimensional images, wherein the overlap of adjacent images is between 10% and 15%, and wherein a time interval between capturing each image and the velocity of movement of the specimen relative to the imaging system are chosen such that each image is substantially free of motion blur.

36. An imaging system as in claim 35, further comprising a computerised stage for moving the specimen in the predetermined path within the imaging system.

37. An imaging system as in claim 35, in which the image capturing subsystem comprises a digital camera.

38. An imaging system as in claim 37, in which the digital camera is a TDI camera.

39. A computer readable medium encoded with computer executable instructions for acquiring image data using an imaging system, wherein the image data represents an image of at least part of a microscope specimen, the executable instructions comprising:
   instructing the imaging system to move the specimen in a predetermined path;
   controlling a two dimensional array of pixels such that it captures a plurality of adjacent overlapping two dimensional images of the specimen while moving the specimen, wherein the images have overlapping regions in the direction of specimen movement; and
   assembling a composite image by removing the duplicated overlapping regions from the captured images,
   wherein the overlap of adjacent images is between 10% and 15%, and wherein a time interval between capturing each image and the velocity of movement of the specimen relative to the imaging system are chosen such that each image is substantially free of motion blur.

40. A method for acquiring image data representing an image of at least part of a microscope specimen using an imaging system having a two dimensional array of pixels to capture corresponding two dimensional images, the method comprising:
   moving the specimen relative to the imaging system in a predetermined path;
   capturing a plurality of adjacent overlapping two dimensional images of the specimen while moving the specimen;
   assembling a composite image from the plurality of captured adjacent overlapping two dimensional images by removing duplicated overlapping regions from the captured adjacent overlapping two dimensional images, and
   performing a cross-correlation of two adjacent images,
   wherein an amount of overlap of the images is sufficient to enable accurate cross-correlation, and wherein the cross correlation is performed in an area of image overlap determined according to the velocity of the specimen at the time the images were acquired.

41. A computer readable medium encoded with a computer program having executable instructions for performing the steps recited in claim 40.

42. An imaging system for acquiring image data representing an image of at least part of a microscope specimen, comprising a two dimensional array of pixels configured to capture a plurality of adjacent overlapping two dimensional images of the specimen while the specimen is moving relative to the imaging system in a predetermined path, the imaging system being configured to assemble a composite image from the plurality of captured adjacent overlapping two dimensional images by removing duplicated overlapping regions from the captured adjacent overlapping two dimensional images and performing a cross-correlation of two adjacent images, wherein an amount of overlap of the images is sufficient to enable accurate cross-correlation, and wherein the cross correlation is performed in an area of image overlap determined according to the velocity of the specimen at the time the images were acquired.

* * * * *